United States Patent [19]

Schumacher et al.

[11] 4,134,514

[45] Jan. 16, 1979

[54] LIQUID SOURCE MATERIAL CONTAINER AND METHOD OF USE FOR SEMICONDUCTOR DEVICE MANUFACTURING

[75] Inventors: John C. Schumacher; André Lagendijk, both of Oceanside, Calif.

[73] Assignee: J C Schumacher Co., Oceanside, Calif.

[21] Appl. No.: 746,923

[22] Filed: Dec. 2, 1976

[51] Int. Cl.$^2$ .................... B65D 17/00; B65D 25/00
[52] U.S. Cl. ................................ 220/85 S; 53/471; 206/818; 215/32
[58] Field of Search ............... 220/85 S; 215/32, 250; 206/219, 220, 818; 53/22 R, 37

[56] References Cited

U.S. PATENT DOCUMENTS

| 1,544,024 | 6/1925 | Moeller et al. ................ 220/85 S |
| 2,184,152 | 12/1939 | Saffir ............................. 206/818 X |

*Primary Examiner*—Richard E. Aegerter
*Assistant Examiner*—Frederick R. Schmidt
*Attorney, Agent, or Firm*—Knobbe, Martens, Olson, Hubbard & Bear

[57] ABSTRACT

The gas inlet tube and the outlet tube in the upper end of a "bubbler" container are each sealed with an easily breakable wall adjacent the wall where the tubes join the container. A second seal is formed on the outer ends of the tubes creating a compartment in which may be positioned a small hammer. The outer seals are sufficient to meet safety regulations regarding the shipment of highly corrosive or poisonous materials. The user of the material, breaks the outer seals, positions the hammer if not already in place, makes the desired connections to the tubes, applies a purging gas to the upper ends of the tubes, and breaks the inner seals by magnetically or otherwise actuating the hammer resting on the inner seal, thereby connecting the material to the desired system without exposing the material to the atmosphere.

5 Claims, 3 Drawing Figures

LIQUID SOURCE MATERIAL CONTAINER AND METHOD OF USE FOR SEMICONDUCTOR DEVICE MANUFACTURING

This invention relates to an improved container and method for shipping and using materials without exposing them to atmosphere and more particularly to a system for handling high-purity liquid source materials used in the manufacturing of semiconductor devices.

It is well established that the successful manufacturing of semiconductor devices is dependent upon use of high-purity raw materials. Although it is more difficult to prove that use of higher and higher purity raw materials produces continued yield improvement (number of acceptable devices per raw material lot) because of the large number of variables affecting yield, such as operator error, manufacturing aid purity, equipment cleanliness etc., this assumption is generally held throughout the industry. Reliability improvements as a direct result of purity improvements, however, are easily demonstrable as are improvements in basic physical parameters such as junction leakage, flat band voltage shift, minority carrier lifetime, etc. Thus optimal use of raw materials requires that they be of the ultimate purity achieveable.

Manufacturing of semiconductor devices is a high-volume, low unit cost process. Competitive pressures result in drastic price erosion with time for a given semiconductor device until the high volume, low unit cost equilibrium state is achieved. Since the device yield, as defined above, is dependent upon raw material purity, the equilibrium or profitable state requires constant raw material purity.

Some of the liquid source materials used in the manufacturing of semiconductor devices are boron tribromide, phosphorous oxychloride, phosphorous tribromide, silicon tetrabromide, arsenic trichloride, arsenic tribromide, antimony pentachloride and any combination of the above.

Since these liquid source materials are to varying degrees hazardous, they require a minimum or zero exposure to worker's handling them. Also, such corrosives, Class B poisons and the like are subject to Department of Transportation and other governmental regulations concerning the transportation of such materials. Thus, these factors must also be taken into consideration in shipping and using these liquid source materials.

Presently, the system most widely used is that the liquid source materials are shipped in flame sealed glass containers or ampoules. Department of Transportation regulations further specify that such containers must be capable of holding fifteen psi gage. The regulations also permit use of steel drums having specified characteristics; however, such containers are unsatisfactory for the liquid source materials discussed above. Metallic impurities such as the alkali and alkaline earth metals as well as the transition metals are particularly harmful to the reliable manufacturing of semiconductor devices.

Even flame sealed glass containers, although preferable to metal containers can degrade the liquid source material through "leaching" of their matrix and impurity atoms by the liquid source material over a period of time. This leaching process is in turn accelerated by analog acid formation within the liquid as a result of exposure to atmospheric moisture. For example, hydrobromic acid is formed rapidly on exposure of boron tribromide to the atmosphere:

$$2BBr_3 + 3H_2O \rightarrow B_2O_3 + 6HBr.$$

The manner in which the liquid source materials have been handled has permitted some exposure to the atmosphere which is not only harmful to purity, but also exposes personnel to hazardous materials. More specifically, after the liquid source material is delivered in the glass ampoule, the user breaks the tip of the ampoule and pours the source material into a "bubbler" container. The "bubbler" has an inlet tube that extends through the upper end of the container and terminates near the lower end, and also has an outlet tube. An inert "carrier gas" such as nitrogen or argon is bubbled into the liquid source material which causes the carrier gas to become saturated with the vapor of the source material. The saturated carrier gas is then fed down stream from the bubbler through a series of valves and transfer tubes into a "diffusion" furnace or thin film reactor to perform its desired function in the production of semiconductor devices.

In this process, the operation of importance is the transfer from the glass ampoule to the bubbler. Here atmospheric exposure occurs causing analog acid to be formed leading to immediate, and continued contamination of the source material by the glass ampoule and the glass bubbler. Note that this both degrades purity and causes it to be time dependent until equilibrium is reached, which may require an extended period. Both of these conditions are undesirable.

In accordance with the present invention, an improved container and method of handling the material is disclosed which satisfies the various requirements of avoiding contamination, avoiding exposure risks to workers, and meeting shipping regulations. This is accomplished by shipping and using the source materials in the same container, avoiding atmospheric exposure and providing the container with a sealing arrangement that will meet safety regulations. This container is provided with a double seal, an outer seal which satisfies pressure requirements of the shipping regulations and an inner seal that can be easily broken after the connections have been made to the container.

More specifically, the container, like a conventional "bubbler", has an inlet tube which extends through a wall in the upper portion of the container and terminates near the bottom wall of the container and an outlet tube. A thin breakable wall is formed across the inlet and outlet tubes near the point where the tubes are attached to the container. The outer ends of the tubes are then closed by flame-sealing or other manner which will meet shipping regulation requirements.

When the bubbler is received by the user, the external seal is removed and the bubbler is connected into the using system. The space in the inlet and tubes between the shutoff valves and the secondary or breakable seals are then flushed with clean dry inert gas to remove atmospheric moisture collected there during the time between removal of the external seal and the making of the connections joining the bubbler to the system. The breakable seals are then broken by appropriate means. For example, a quartz enclosed metal hammer may be positioned in the inlet and outlet tubes above the breakable seal. This can be done by the party marketing the bubbler and the liquid source material or it can be done by the user after the outer seal has been removed. Such a hammer is movable magnetically such as by moving a small magnet adjacent the exterior of the tube so as to lift the hammer and then removing the magnet or moving it quickly downwardly causing the hammer to break the thin wall of quartz forming the secondary seal. In this manner, the liquid source material is shipped and utilized without atmospheric exposure.

Although the bubbler and hammer enclosure are preferably made of quartz, possibly other materials can be utilized which will meet the necessary requirements.

For a more thorough understanding, refer now to the following detail specification and drawings in which.

Figure 1:
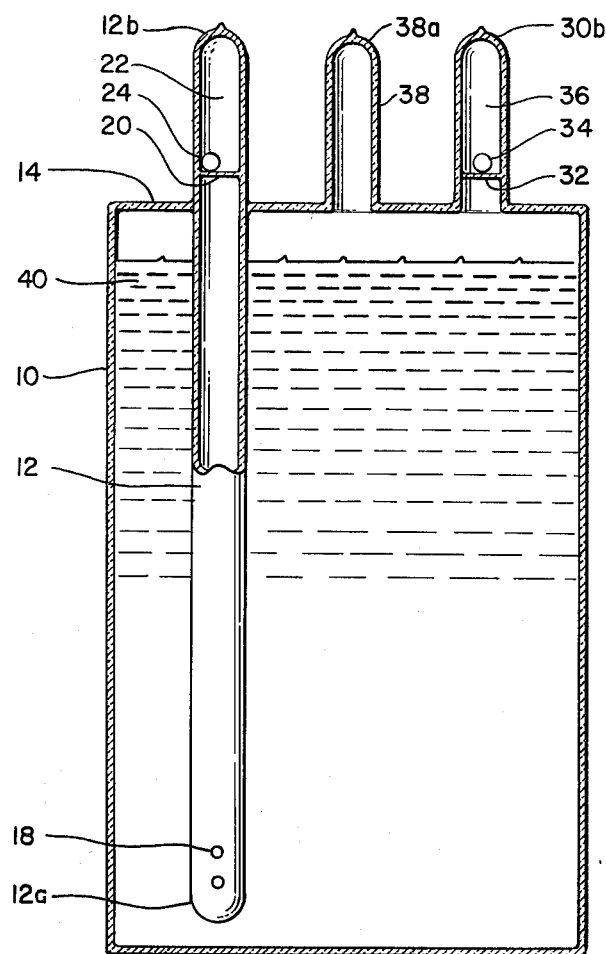
FIG. 1 is a cross-sectional view of the container of the invention as it is shipped.

Referring now to FIG. 1, there is shown a cylindrical container 10 forming a sealed chamber with an inlet tube 12 extending through and secured to the upper wall 14 of the container. The lower end 12a of the tube terminates near the bottom wall 16 of the container and has one or more openings 18 in its lower end. The upper portion of the tube 12 extends above the upper container wall 14 and the upper end 12b is closed. The container and the tube is preferably made of quartz and hence, the upper end may conveniently be flame-sealed.

A thin internal wall 20 extends across the tube at a point adjacent or slightly above the upper wall 14, and is spaced from the upper end 12b to form a small compartment 22. The wall 20 thus forms an internal second seal blocking entry to the container through the inlet tube 12. The wall 20 is made quite thin so that it is readily frangible or breakable. Shown positioned on the wall 20 is a small hammer 24 consisting of a small piece of magnetically attracted metal encased in quartz.

An outlet tube 30 is shown with its lower end attached to the upper wall 14 of the container and open to the container interior. The tube upper end 30b is closed by flame-sealing or other suitable means. As with the inlet tube, there is provided a thin internal wall 32 which forms a second seal for the container through the tube 30. Also, as with the inlet tube, there is provided a small hammer 34 located on the wall 32 in the compartment 36 between the wall 33 and the upper end 30b of the tube 30.

A third tube 38 used for filling the container, is attached to the upper wall 14 of the container, with the upper end 38a of tube 38 being shown in closed condition after the filling operation.

As explained above, the primary purpose for the container 10 is to hold ultra high purity liquid source material used in connection with the manufacturing of semiconductor devices. Most of such liquids are dangerous because of their corrosive or toxic characteristics. Thus, care is taken in positioning the liquid 40 in the container in a manner to maintain its purity and to properly protect the personnel. The liquid is shipped to the user in the container shown, consequently, the seals 12b, 30b and 38a on the upper ends of the tubes as well as the rest of the exterior portions of the container must be able to withstand at least 15 psi gage pressure since that is a current requirement for such materials by the Department of Transportation of the U.S. Government. The internal seals 20 and 32 in the inlet and outlet tubes respectively may not be sufficient to handle such pressures which is one of the reasons the outer seals are provided.

Figure 2:
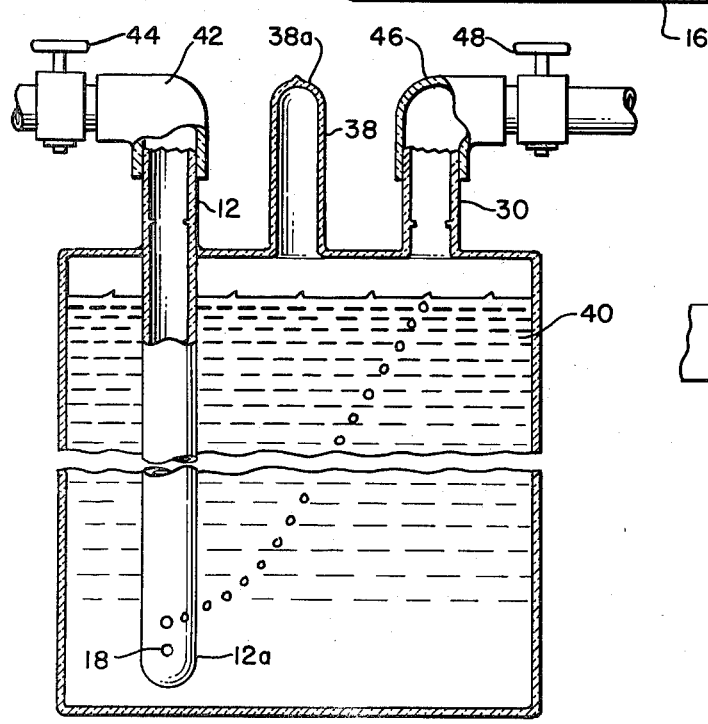
FIG. 2 is a cross-sectional view showing the container after the inlet and outlet connections to the container have been made and the inner seals have been broken.
Figure 3:
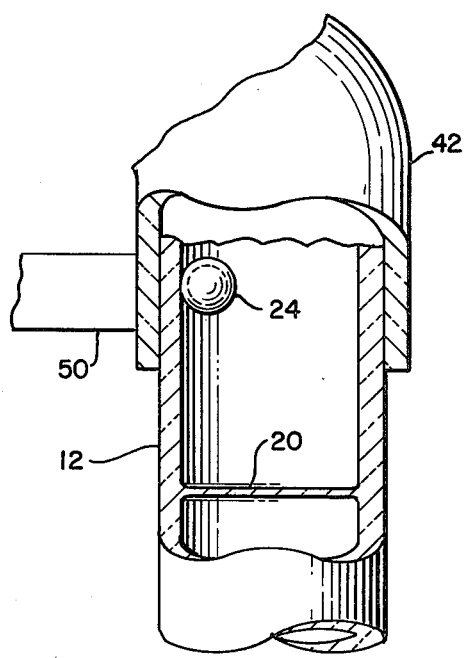
FIG. 3 is an enlarged cross-sectional view of one of the tubes illustrating the manner in which the inner seal is broken.

After the container has reached the user it can be used as a bubbler in utilizing the liquid 40 in a semiconductor device manufacturing process. First, the upper ends 12b and 30b of the inlet and outlet tubes are opened. Hammers 24 and 34 are then positioned above seals 20 and 32 if not received in that position. An inlet connection 42 with a valve 44 is connected to the open upper end of the inlet tube 12 and a similar connection 46 with a valve 48 is made to the open upper end of the outlet tube 30 as shown in FIG. 2. The connections and the open upper ends of the tubes are then bathed in an inert gas such as nitrogen or argon to remove any moisture that may have gotten into that area while the connections were being made.

The inner seals 20 and 32 on the inlet and outlet tubes can now be safely broken without concern for the liquid 40 being exposed to the atmosphere. These walls are broken by positioning a magnet 50 adjacent the magnetic hammer 24 and raising the magnet, which causes the hammer to follow, and removal of the magnet will cause the hammer to fall and break the seal. The hammer encased in quartz to prevent contamination can fall harmlessly into the lower end of the tube 12 or into the container 10, in the case of the outlet tube 30.

The interior of the container is now open to the inlet and outlet connections 42 and 46 and the liquid source material 40 within the container has not been exposed to the atmosphere. Nitrogen or some other inert gas is now applied to the container through the inlet tube 12 so that it bubbles upwardly through the liquid source material becoming saturated with the material, and then leaves the container by way of the outlet tube 30 to be utilized in the manufacturing process of the semiconductor devices.

What is claimed is:

1. A container for material which is not to be exposed to atmosphere comprising:
   walls defining a sealed chamber;
   a tube for access to the chamber connected to one of the chamber walls;
   wall means extending across said tube providing an inner seal allowing access to said chamber only upon being ruptured;
   means extending across said tube spaced outwardly from said inner seal to form an outer seal to prevent any manual access to said inner seal without first rupturing said outer seal;
   a liquid material contained within said chamber and maintained exclusively on one side of said inner seal, the space between said seals being devoid of liquid; and
   said outer seal being sufficiently strong to comply with safety regulations concerning the shipment of said material, and said inner seal being readily breakable so that it may be broken without manual access to the interior of the tube after the outer seal has been broken and a connection has been made to the tube for using the material, said container and seals being made of a material which is highly inert with respect to the material in the container.

2. The container of claim 1 wherein said tube enters said chamber near the upper portion of the container and the lower end of the tube extends into the chamber and terminates near the lower end of the container so as to be emersed in the liquid material, means forming one or more openings in the lower end of the tube so that the tube can serve as an inlet for gas to be applied to the liquid material; and including an outlet tube attached to the upper portion of the container, said outlet tube having wall means forming an inner readily breakable seal and means forming an outer seal which complies with shipping requirements for the material to be shipped in the container.

3. The container of claim 2 including a hammer positioned in the inlet tube and the outlet tube being supported on the wall means forming the readily breakable seals, said hammers being movable by external means while the system is closed and being encased in a material which is inert with respect to the material to be shipped in the container.

4. The container of claim 1 including a small hammer positioned on the means forming said inner seal, said hammer being made of a material which is magnetically movable and is encased in a material which is inert with respect to the material to be stored or shipped in the container.

5. A container and bubbler device for shipping, storing and using a liquid without exposing it to atmosphere comprising:

walls defining a sealed glass chamber;

an inlet glass tube for access to the chamber fused to and extending through a wall of the chamber and terminating near the lower end of the chamber, said tube having one or more openings in its lower end so that the tube may serve as an inlet for gas to be ducted to the lower end of said chamber;

a second tube fused to an upper wall of the chamber, said second tube providing an outlet for the gas to be applied to the chamber;

a glass wall extending across each of said tubes formed integrally therewith providing an inner seal to prevent access to said chamber;

glass wall means extending across each of said tubes and formed integrally therewith spaced outwardly from said inner seal to form an outer seal; and a high purity liquid contained within said chamber and isolated from the spaces between said inner and outer seals, said spaces being devoid of liquid; and said outer seals being sufficiently strong to comply with safety regulations concerning the shipment of said material and said inner seals being readily breakable so that they may be ruptured without manual access to the interior of said tubes after the outer seals have been broken and connections have been made to said tubes for using the material.

* * * * *